Oct. 25, 1927.
C. H. TOMLINSON
1,646,433
CAR TRUCK STABILIZER
Filed July 14, 1925
2 Sheets-Sheet 2
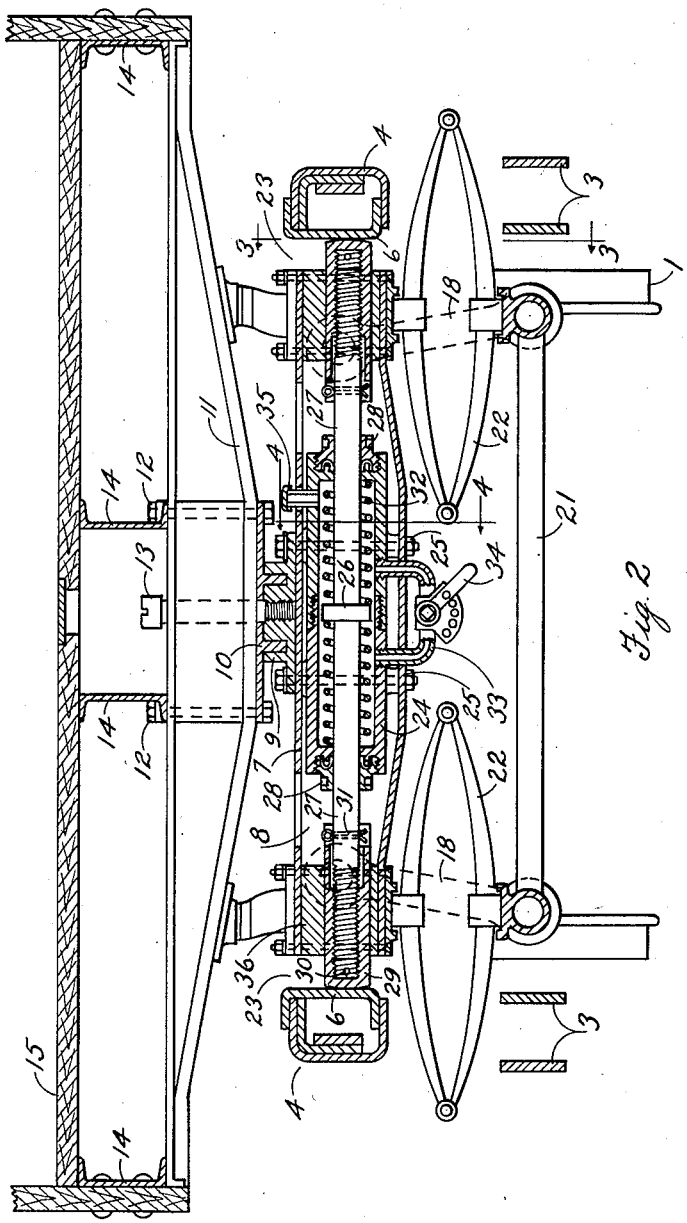
Inventor
Charles H. Tomlinson
Wm. H. DeGraff
By
[signature]
Attorney Patented Oct. 25, 1927.

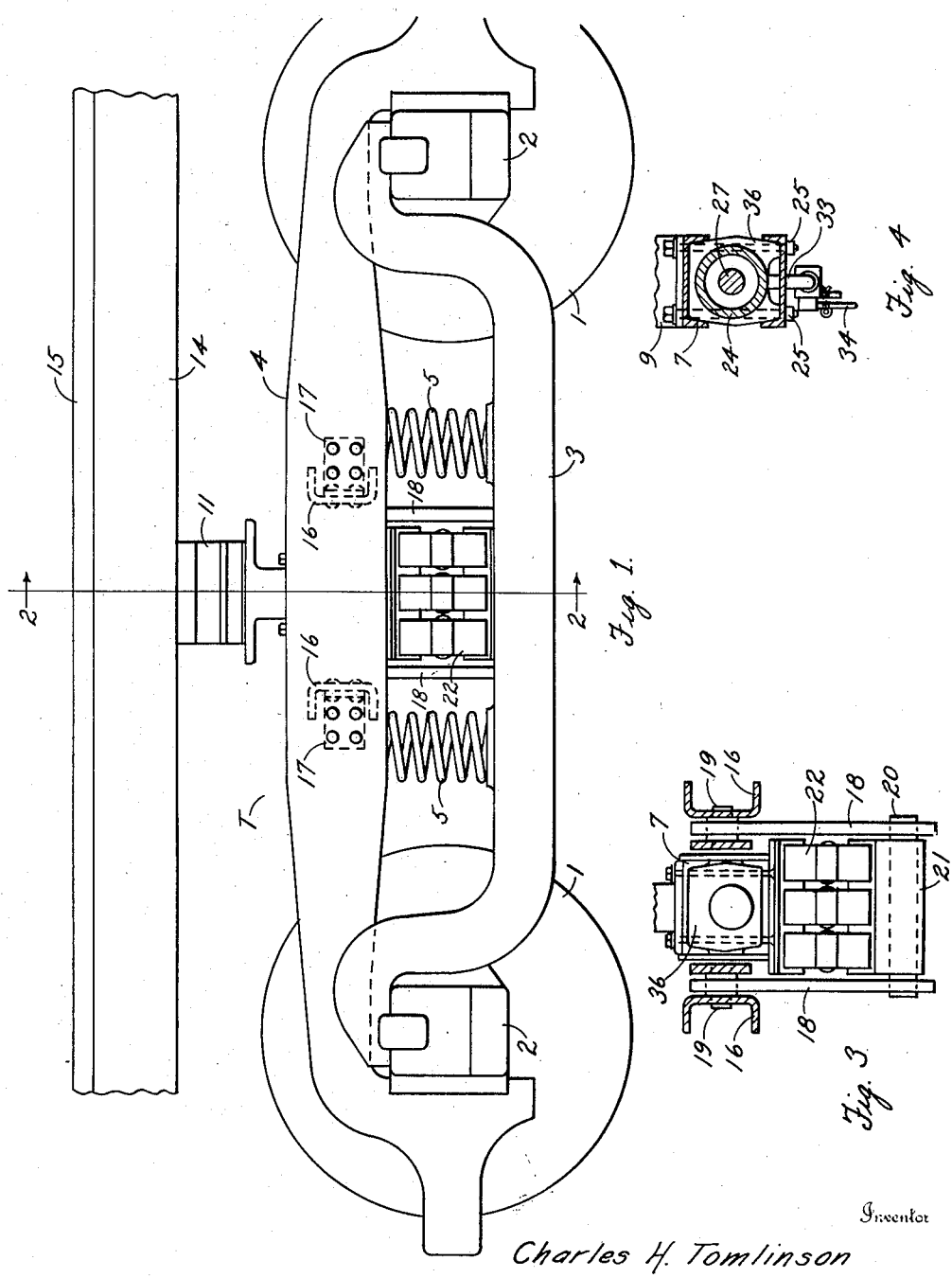

1,646,433

UNITED STATES PATENT OFFICE.

CHARLES H. TOMLINSON, OF MANSFIELD, OHIO, ASSIGNOR TO THE TOMLINSON COUPLER COMPANY, OF MANSFIELD, OHIO, A CORPORATION OF OHIO.

CAR-TRUCK STABILIZER.

Application filed July 14, 1925. Serial No. 43,502.

My invention relates to car trucks and has particular reference to the means of stabilizing the transverse movement of the car body relative to the side frames of the truck.

The object of my invention is to provide means for preventing a quick and maximum side movement of the car body relative to the truck, as for instance, when the car may start suddenly around a curve or when passing over special track work.

Another object is to retard the side movement of the car body relative to the truck in both directions and also to retard the return movement of the car body to a central position. In present devices where springs are used the return movement to a central position is under the full compressive action of the spring and is sudden, and the car is returned to a position beyond the center.

Another object of my invention is to provide means for maintaining or assisting to maintain the car body central with respect to the truck.

My invention resides in the new, novel and unique construction, combination and relation of the various parts herein described and shown in the accompanying drawings.

In the drawings:

Fig. 1 is a side view of a truck frame which is intended to be more indicative than specific as my invention does not reside in the truck frame as such and can be used with truck frames of various constructions.

Fig. 2 is a view in partial section on the line 2—2 of Fig. 1.

Fig. 3 is a partial sectional view on the line 3—3 of Fig. 2.

Fig. 4 is a sectional view on the line 4—4 of Fig. 2.

In the preferred embodiment of my invention I employ a truck T which may be of various constructions and of which there are various constructions upon the market, but in the drawings I have shown a truck which comprises two sets of wheels 1 provided with axles and upon the journal boxes 2 are supported equalizer bars 3. It will be recognized that there are equalizer bars on opposite sides of the truck. The truck is also provided with a truck frame 4 which is usually a frame of rectangular shape and which is yieldingly supported by means of the truck frame springs 5 upon the equalizer bars. The truck frame is free to move not only vertically but laterally with respect to the truck and equalizer bars. Positioned between the side members 6 of the truck frame 4, and movable relatively thereto, is a transversely disposed truck bolster 7 which is usually formed up out of plates and castings having a recess 8 therein. Mounted on the bolster 7 is a bolster center plate 9 secured central thereto by bolts. Mounted upon the bolster center plate 9 is a cooperating bolster center plate 10 arranged to rotate relative to the plate 9 and interlocked therewith against lateral movement.

To the bolster plate 10 is secured a body bolster 11 by means of the bolts 12. The body bolster is prevented from vertical displacement upward through the use of the king bolt 13. Mounted upon the body bolster through the medium of the sills 14 is a car body 15.

In order to support the truck bolster 7 I have shown in Fig. 3 a form of truck bolster hanger which may be employed and which comprises a pair of cross members 16 the ends of which are secured to the side members 4 of the truck frame by means of angle braces 17. Pivotally mounted adjacent the opposite ends of the cross members 16 are bolster hangers 18 which are swivelly secured to the members 16 by means of the fastening 19 and about which the hangers 18 may pivot or swing transversely of the truck frame. Secured to the lower end of the hanger 18 is a pin 20 which not only holds the lower end of the hangers 18 in a fixed position, but also supports and positions the spring plank 21 which may consist of a single transverse member with hollow ends to receive the pins 20 or the transverse portions may comprise a plurality of members. Mounted upon the ends of the spring plank 21 are a plurality of elliptical springs 22 and upon the elliptical springs rests the body bolster 7. It will be noted that the axes of the hangers 18 at the opposite ends of the spring plank 21 are angularly disposed and this provides means tending to maintain the body bolster in a central position relative to the side frames 6 of the truck frame 4.

From this it will be seen that the body bolster with a car mounted thereon is free to move relative to the truck frame 4 and since it is usual to allow a space 23 between the ends of the truck bolster 7 and the side frames 6, it is quite evident that with the side lurching of the car body that the ends of the truck bolster 7 will move into engagement with the inner faces of the side frames 6, and this produces a sudden stopping of the side movement of the car body relative to the truck frame and produces considerable jar and annoyance to passengers, and under some conditions where the track is rough this side action may be quite severe regardless of the hangers and other means which may be employed such as springs for maintaining the truck bolster central.

I have, therefore, provided means which may be used in combination with the truck to not only stabilize the lateral movement of the truck bolster with respect to the truck frame, but tends to prevent under severe conditions the excessive shocks transmitted to the car body through the truck bolster engaging the side members 6 of the truck frame 4, and my invention also provides means for tending to maintain the bolster central with respect to the truck frame and to return the bolster to a central position when the same has moved out of center. It will be understood, of course, that the central position referred to is a relative matter as with the heavy equipment used and a more or less unbalanced condition of the car body the vertical center line of the truck bolster probably will not assume an exact central position with respect to the truck frame.

The means I employ for stabilizing the movement of the car body and truck bolster relative to the truck frame comprises a cylinder 24 which I preferably form of two parts shown as fastened together by screw threads at their inner ends. This construction, however, may be otherwise as will be apparent to those skilled in the art. The cylinder 24 is positioned within the space 8 in the truck bolster 7 and is secured thereto against relative movement, and I have shown the same as secured in position by means of the bolts 25 which also secure the bolster center plate 9 in position. Other means, of course, of securing the cylinder 24 in position may be used. Mounted within the cylinder 24 is a piston 26 and the outer diameter of the piston 26 is made somewhat less than the bore of the cylinder. This difference may vary or it may be a close fit if desired, but I prefer a difference as this prevents wear between the piston and the cylinder and offers a passage for the transfer of oil contained within the cylinder from one end to the other as the piston is displaced longitudinally within the cylinder and relative thereto.

Projecting from the opposite side of the piston 26 are piston rods 27 which project some distance beyond the ends of the cylinder 24 and surrounding the pistons are packing boxes 28 whereby leakage of oil or other fluid contained within the cylinder 24 is prevented. Threadably secured to the outer end of each piston rod 27 is an adjustable collar 29. It will be noted that the ends of the rod 27 do not extend to the extreme inner end of the collar 29 which permits adjustment of the collar upon the rod so as to increase or decrease the length of the rod with respect to the side members 6 of the truck frame 4. In order to rotate the collars 29 with respect to the rods 27 there is provided a hole 30 for use of a spanner wrench and in order to lock the member 29 in position I may employ a cotter pin 31 engaging slots in the inner end of the collar 29. In adjusting the length of the rods 27 I usually do so by making the total length of the two rods equal to the distance between the oppositely disposed side frames 6 or very close thereto. Disposed on opposite sides of the piston 26 and between the corresponding ends of the cylinder 24 are springs 32.

Communicating with the interior of the cylinder and on opposite sides of the piston 26 is a by-pass 33, the opening of which is controlled by a valve 34. The by-pass 33 and the valve 34 provide means for regulating the flow of fluid from one side of the piston 26 to the opposite under relative movement of the piston and cylinder, and this is found an advantage as it is a means of increasing the flow which normally takes place between the piston and the cylinder as this flow is usually not large.

It will be noted that the piston 26 and the rods 27 are practically immovable transversely of the truck frame and relative to the side frames 6, but the truck bolster 7 is movable relative to the side frame 6 and, therefore, it is movable relative to the piston 26 and since the cylinder 24 is fixed relative to the truck bolster 7 the cylinder must move relative to the piston 26 whenever the bolster 7 moves relative to the side frames 6 in a transverse direction. It will be evident that the springs 32 will tend to center the truck bolster 7 in addition to the truck bolster hanger rods 18. It will also be noted that the rods 27 and their collars 29 are movable vertically with respect to the truck frame 4.

It will also be apparent to those skilled in the art that with a truck as described or with other similar trucks, which may be equipped with the piston and cylinder arrangement heretofore described, that when the car body and truck bolster tend to move sideways that the oil or other fluid contained within the cylinder 24 and on opposite sides of the piston 26 must transfer from one side of the piston to the opposite side or there can be no side movement of the boltser 7 relative to the truck frame 4, but this side movement is desirable to reduce wear and tear upon the equipment and to offer easier riding in the case of passenger cars and, therefore, the space between the piston 26 and the cylinder 24 will permit of a transfer of fluid from one end of the cylinder to the other and hence will permit relative movement of the truck bolster with respect to the truck frame. The amount of this fluid transfer may be increased or regulated by means of the by-pass 33 and the valve 34 therein or if there is no space left between the piston 26 and the cylinder 24 then all of the transfer of fluid will take place through the by-pass 33 and can be regulated as desired by means of the valve 34.

It will be evident that the truck bolster having moved to one side with respect to the vertical centers that neither the spring 32 or the centering effect of the hangers 18 will return the truck bolster to the central position rapidly because the oil must be re-transferred from end to end of the cylinder and this will involve a time element, depending upon the space between the piston 26 and the cylinder, and the setting of the valve 34 and likewise a sudden side movement of the truck bolster relative to the truck frame will prevent the end of the truck bolster from sudden and vicious contact with the truck frame 4.

From the description and drawings it is believed it will be clear that my invention will tend to stabilize or tend to hold the car body central with respect to the truck, but will permit movement off of center, but will tend to retard such movement and also retard a return movement to central position and, therefore, will reduce wear and tear upon the equipment and produce easier riding properties for the passengers.

In order to fill the cylinder 24 with oil or other fluid I provide a capped inlet 35. The ends of the truck bolster 7 are provided with supports 36 which in turn are provided with a passage therethrough to receive the collar 29 in slidable relation thereto.

There are many modifications which will be apparent to those skilled in the art, therefore, I do not wish to be limited other than by my claims.

I claim:

1. The combination with a car truck provided with a transversely movable truck bolster, of fluid pressure means to retard the movement of the truck bolster to either side from the center and to retard the return of the truck bolster to its central position and yielding means connected to the fluid pressure means tending to return the bolster to its central position.

2. The combination with a car truck provided with a transversely movable truck bolster, of fluid pressure means to retard the movement of the truck bolster to either side from the center and to retard the return of the truck bolster to its central position comprising a cylinder, a piston and fluid within the cylinder and springs interposed between the cylinder and piston.

3. The combination with a car truck provided with a transversely movable truck bolster, of a combined fluid pressure and spring actuated means to retard the movement of the truck bolster to either side from the center and to retard the return of the truck bolster to its central position comprising two relatively movable members, one stationary relative to the truck frame and the other stationary relative to the truck bolster and springs interposed between the members and a liquid interposed between the members and adapted to have pressure applied thereto upon relative movement of the members in either direction.

4. The combination with a car truck provided with a transversely movable truck bolster, of a combined fluid pressure and spring actuated means to retard the movement of the truck bolster to either side from the center, to return the bolster to its central position and to retard but not prevent the return of the truck bolster to its central position comprising two relatively movable members and interposed liquid and springs.

5. The combination with a car body and truck therefor, of means interposed therebetween to retard relative side movement comprising two relatively movable members one of which is substantially immovable sideways relative to the truck and having a noncompressible fluid interposed between the members and to have pressure applied thereto upon relative side movement of the car body and truck and means to adjust the length of the other member.

6. The combination with a car body and a truck therefor, of fluid pressure and spring actuated means interposed therebetween to retard the movement of the car body to either side from the center, to return the car body to the central position and to retard the return of the car body to its central position but not prevent it and means to adjust the rate of retard.

7. The combination with a car body and a truck for the same, of a piston rod and piston thereon, means to adjust the rod relative to the truck, a cylinder enclosing the piston and portion of the rod in movable relation, fluid therein, means to by-pass the fluid from one end of the cylinder to the other end, means to adjust the amount of flow of the fluid to retard the relative movement of the cylinder and piston and means to connect the car body to the cylinder move in unison.

8. The combination of a truck frame and wheels therefor, of a transversely movable member supported from the frame by springs, means normally tending to maintain the movable member in a relative central position with respect to the frame, fluid pressure means to retard transverse movement of the frame and movable member and yielding means forming part of the fluid pressure means tending to return the truck frame and the movable member to their normal position.

9. The combination with a truck frame and a bolster freely movable sideways, of a piston rod adjustable as to length and positioned between the side members of the truck, a piston positioned on the rod, a cylinder secured to the bolster and enclosing the piston and yielding means interposed between the piston and cylinder tending to return the bolster to its normal position.

10. The combination with a truck frame and a bolster freely movable sideways, of a piston and a piston rod projecting therefrom in opposite directions and engaging the opposite side members of the truck frame, a cylinder enclosing the piston and portions of the rods and connected to the bolster, a liquid in the cylinder and means to by-pass the liquid from one side of the piston to the other when the piston moves relative to the cylinder.

In testimony whereof I affix my signature.

CHARLES H. TOMLINSON.